United States Patent [19]

Barthel et al.

[11] Patent Number: 4,466,040
[45] Date of Patent: Aug. 14, 1984

[54] SAFETY DEVICE

[75] Inventors: Richard C. Barthel, Chicago, Ill.;
Richard D. Roy, Valparaiso, Ind.

[73] Assignee: The Singer Company, Stamford, Conn.

[21] Appl. No.: 376,440

[22] Filed: May 10, 1982

[51] Int. Cl.³ .............................................. H02H 3/24
[52] U.S. Cl. ...................................... 361/92; 307/130
[58] Field of Search .................... 361/1, 92, 98, 187; 307/125, 130, 131; 340/663, 664

[56] References Cited

U.S. PATENT DOCUMENTS 3,718,839  2/1973  Conti et al. ........................... 361/92
3,958,164  5/1976  Hess .................................. 361/92 X
4,086,643  4/1978  Jacobs ................................ 361/92

Primary Examiner—Harry E. Moose, Jr.
Attorney, Agent, or Firm—David L. Davis; Robert E. Smith; Edward L. Bell

[57] ABSTRACT

A safety device for use with an electric appliance to prevent the appliance from inadvertently being started if the appliance is plugged into an outlet when the on-/off switch of the appliance is in its on state. A low level sensing current is applied to the appliance before full operating power is applied to the appliance. Detection of the low level sensing current prevents application of full operating power. If no sensing current is detected, full power is applied and the detector is disabled.

13 Claims, 4 Drawing Figures

SAFETY DEVICE

DESCRIPTION

BACKGROUND OF THE INVENTION

This invention relates to safety devices for electric appliances and, more particularly, to a safety device which prevents an electric appliance or the like from inadvertently starting when the appliance is plugged into an electric outlet with its switch in the on state.

If an electric appliance or tool which has an on/off switch is plugged into a live AC outlet when the switch is in its on state there is the possibility of both personal injury and property damage occurring. Similiarly, if power is lost while such appliance or tool is being utilized and the operator neglects to turn the device off prior to power restoration, when power is restored the same type of injury or damage may occur. Exemplary devices with which this problem exists include an electric knife, electric food mixer, electric blender, electric food processor, electric drill, electric router, electric hand saw, electric sabre saw, electric buffer, electric sander, electric hedge trimmer, and electric lawn mower. Many other potentially dangerous devices exist which are subject to the same type of inadvertent operation. It would therefore be desirable to be able to prevent such inadvertent operation of an electric appliance, tool, or the like.

It is therefore an object of the present invention to provide a safety device for use with an appliance having an on/off switch which prevents the appliance from operating if power is applied to the appliance when the switch is in the on position.

Various devices have been proposed to prevent such inadvertent operation of an appliance. An example of such a device is disclosed, for example, in U.S. Pat. No. 2,985,800. However, such devices generally suffer from a number of disadvantages. For example, many of these devices are built into the appliance and are physically interconnected with the power-supplying switch of the appliance. These devices generally include a relay and require that the power-supplying switch of the appliance be a single pole double throw switch arranged to supply power to the relay coil only when the switch is in its off position. The relay is then locked on by a normally open contact thereof, which contact then allows power to be applied to the appliance when the switch is subsequently moved to its on position. Problems with such a device include the fact that it is dedicated to the appliance and also that it requires a special switch.

It is therefore another object of this invention to provide such a device which does not have to be built into the appliance so that it can be utilized to protect appliances which are already in the hands of consumers.

It is a further object of this invention to provide such a device which is operative with an appliance having a single pole single throw power-supplying switch.

It is yet another object of the present invention to provide such a device which is functional with variable speed appliances.

It is still a further object of the present invention to provide such a device which may be plugged into an AC outlet and into which may be plugged an appliance, or which may be built as part of the line cord assembly of the appliance, or which may be built into the appliance itself, or which may even be installed in an outlet box.

SUMMARY OF THE INVENTION

The foregoing and additional objects are attained in accordance with the principles of this invention by providing a safety device adapted to be connected between a source of AC power and power input terminals of an electric appliance having a switch for selectively closing a current carrying path for the appliance, the safety device functioning to interrupt the application of operating power to the appliance when the appliance switch is closed upon an initial connection of the appliance to the AC power source through the safety device. The safety device includes a power supply portion and a sensing portion. When the appliance is connected to the safety device and AC power is applied to the safety device the power supply portion starts timing a predetermined interval, at the end of which a high operating current path is provided for the appliance. Simultaneously with the timing, the sensing portion provides a low current path for the appliance. The low current is insufficient for any dangerous operation of the appliance. If the appliance switch is closed, the sensing portion senses low current flowing through the path and disables the power supply portion of the safety device. If no current is sensed by the sensing portion, at the end of the predetermined time the high current path provided by the power supply portion bypasses the low current path so as to inhibit operation of the sensing portion.

In accordance with an aspect of this invention, the safety device includes an indicator responsive to the disabling operation of the sensing portion for providing an indication that the appliance switch is closed and operating power is not being supplied thereto.

In accordance with another aspect of this invention, the appliance has an input plug assembly including a pair of prongs and the safety device includes a receptacle adapted to except the prongs. Within the receptacle is a pair of separate contact elements adapted to be electrically connected together by one of the prongs when the plug assembly is inserted into the receptacle. The contact elements are so arranged to insure the appliance is connected to the safety device prior to being connected to the AC line.

BRIEF DESCRIPTION OF THE DRAWINGS

The foregoing will be more readily apparent upon reading the following description in conjunction with the drawings in which like reference characters in different figures thereof denote like elements and wherein.

DETAILED DESCRIPTION

Figure 1:
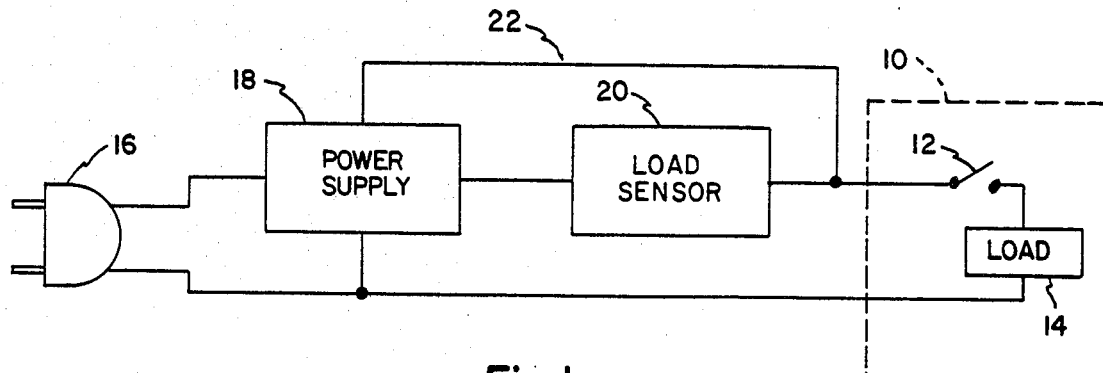
FIG. 1 is a general block diagram useful for understanding the principles of this invention.

Referring now to the drawings, FIG. 1 is a general block diagram useful in understanding the principles of this invention. For purposes of the following discussion, the word "appliance" will be utilized to refer to an electric appliance, tool or the like, to which this invention pertains. As shown in FIG. 1, an appliance designated generally by the reference numeral 10 which may be used with apparatus constructed in accordance with this invention includes a power-supplying switch 12 which, when in its open condition, as shown in FIG. 1, prevents the application of power to the load 14 and when in its closed condition provides a current path for the load 14. The load 14 is typically an electric motor which may be fixed speed, multiple speed or variable speed. The safety device according to the present invention includes an input means for connecting the safety device to an AC power source (not shown). In FIG. 1, this input means is shown as a conventional plug assembly 16, although it is understood that a device constructed in accordance with this invention may be built directly into a wall outlet, in which case the input means would be the wires which connect the wall outlet to the source of AC power. The safety device further includes a power supply portion 18 and a load sensor portion 20. The load sensor portion 20 functions to determine whether the switch 12 is closed when power is applied to the plug assembly 16. If this is the case, the load sensor 20 disables the power supply 18. In the event that the switch 12 is open when power is applied to the plug assembly 16, the power supply 18 closes a path from the plug assembly 16 to the lead 22 which bypasses the load sensor 20 and makes AC power directly available to the appliance 10. As shown in FIG. 1, the appliance 10 is shown as being directly connected to the safety device. Such connection can be where the safety device is built into the appliance to be protected or, alternatively, where the safety device is part of the line cord assembly. However, in accordance with the principles of this invention and as will be described in full detail hereinafter, this safety device may also be separate from the appliance 10 and may be either a stand alone device which plugs into the AC outlet or may be built into the outlet itself.

Figure 2:
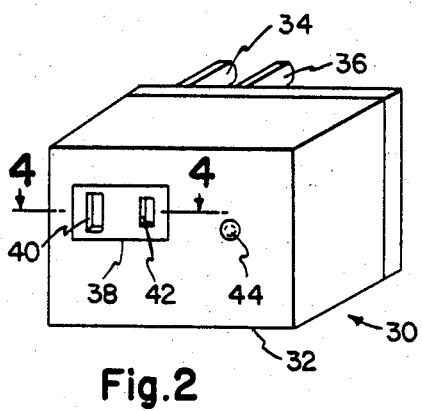
FIG. 2 is a perspective view of an illustrative embodiment of the safety device according to this invention, which embodiment is a "stand alone" version of the safety device adapted for insertion into an AC outlet and wherein the appliance is to be plugged into the safety device.

FIG. 2 is a perspective view of a safety device constructed in accordance with the principles of this invention as a stand alone device adapted to be plugged into an AC outlet and into which it plugged an appliance. This safety device, designated generally by the reference numeral 30 illustratively includes a housing 32 out of which extends a pair of prongs 34, 36 of the conventional type which are adapted to be inserted into a conventional AC outlet. The safety device 30 also includes an output means for connecting the power input terminals of the appliance to the safety device. In FIG. 2, this output means includes a receptacle 38 adapted to accept in openings 40 and 42 thereof the prongs of a conventional appliance AC input plug assembly. The safety device 30 also includes an indicator 44, the purpose and functioning of which will be described in full detail hereinafter.

Figure 3:
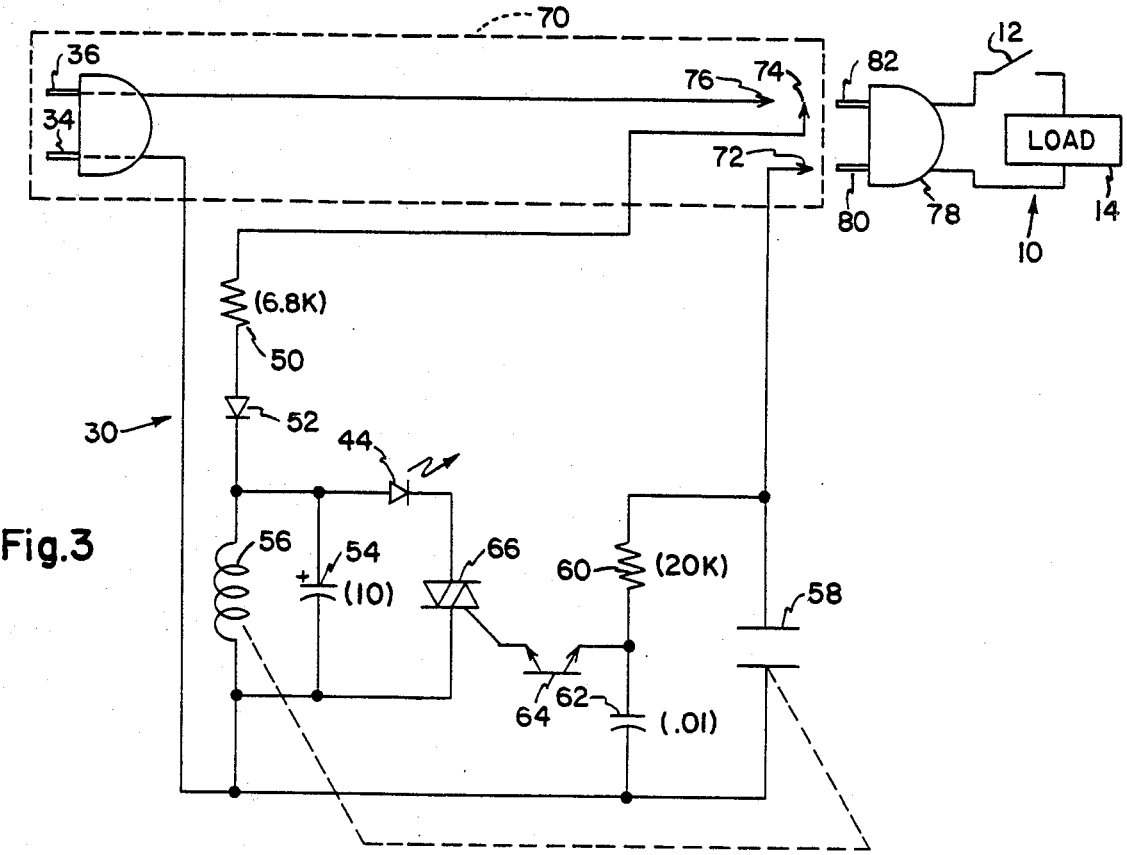
FIG. 3 is a detailed schematic diagram of exemplary circuitry within the embodiment shown in FIG. 2.

Referring now to FIG. 3, shown therein is a detailed circuit diagram of an illustrative safety device 30 constructed in accordance with the principles of this invention. In FIG. 3, the numbers in parentheses next to the resistors and capacitors are the resistance values, in ohms, and the capacitance values, in microfarads, for a preferred circuit embodiment. In this circuit, to correspond with the blocks FIG. 1, the power supply portion 18 consists of the resistor 50, the diode 52, the capacitor 54 and a relay having an energizing coil 56 and a normally open contact pair 58. AC voltage appied to the anode of the diode 52 will charge the capacitor 54 during positive half cycles of the incoming AC voltage. The resistor 50 limits the current available to charge the capacitor 54 while the combination of the resistor 50 and the resistance of the energizing coil 56 will limit the maximum voltage across the capacitor 54. The circuit as designed insures that more than one full AC line cycle will be required to charge the capacitor 54 to a level sufficient to fully energize the energizing coil 56 to close the normally open contact pair 58.

The load sensing portion 20 includes the resistor 60, the capacitor 62 and the diac 64, which is chosen to have a breakdown voltage illustratively in the range of 20-30 volts.

Figure 4:
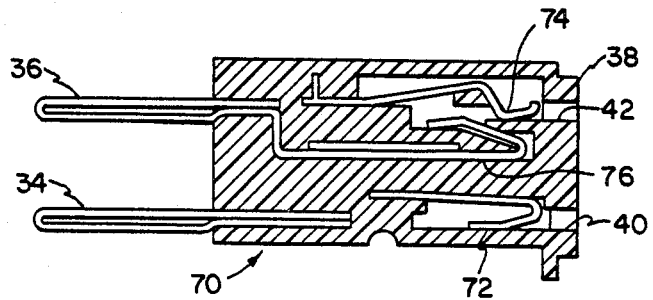
FIG. 4 is a sectional view taken along the line 4—4 in FIG. 2 showing an illustrative socket for the safety device constructed in accordance with the principles of this invention.

Before proceeding further with the description of the operation of the circuitry shown in FIG. 3, the reader is referred to FIG. 4 which is a cross sectional view taken along the line 4—4 in FIG. 2 which shows a special socket arrangement specifically designed for use when the safety device of this invention is adapted to have the input plug assembly of the protected appliance inserted therein, either when constructed as a stand alone device (FIG. 2) or built into an outlet. As shown in FIG. 4, the special socket, designated generally by the reference numeral 70, includes the prongs 34, 36 and the openings 40, 42. When the prongs of an input plug assembly are inserted into the socket 70, one of the plugs makes contact with the contact element 72. The other prong of the input plug assembly first makes contact with the contact element 74 and then makes contact with the contact element 76, which is an extension of the prong 36. This arrangement insures that the appliance is connected to the safety device prior to being connected to the AC line.

Returning now to FIG. 3, if the socket 70 is connected to an AC power source and no input plug assembly is inserted in the receptacle 38, the contact elements 74 and 76 are separated and no power is applied to the circuitry. When the input plug assembly 78 of the appliance 10 is inserted into the receptacle 38, the prong 80 of the plug assembly 78 contacts the contact element 72 and the prong 82 of the plug assembly 78 first contacts the contact element 74 and then contacts the contact element 76, so that the contact elements 74 and 76 are together in electrical contact with the prong 82. If the switch 12 of the appliance 10 is open at this time, as shown in FIG. 3, the capacitor 54 will begin to charge and after a predetermined time the voltage thereacross will be sufficient so that the energizing coil 56 will cause the normally open contact pair 58 to close. This will provide full AC power at the prongs 80 and 82 of the input plug assembly 78 of the appliance 10 so that subsequent closure of the switch 12 will permit the appliance 10 to be operated in the normal manner for which it was designed. However, if the switch 12 of the appliance 10 were closed at the time the input plug assembly 78 was inserted into the receptacle 38, a low level current carrying path is established through the appliance 10 which would cause the capacitor 62 to begin charging through the resistor 60. The component values of the sensing portion are chosen so that the current allowed to flow through the appliance is at a level below that at which dangerous operation of the appliance can occur.

Further, the time constant of the resistor 60 and capacitor 62 is less than the time constant of the resistor 50 and the capacitor 54 so that the breakdown voltage of the diac 64 is reached (across the capacitor 62) before the voltage across the capacitor 54 allows the energizing coil 56 to close the normally open contact pair 58. At the same time as the capacitor 62 is being charged, the capacitor 54 is also being charged. When the voltage across the capacitor 62 reaches the 20–30 volt threshold determined by the diac 64, the diac 64 switches to a low impedance mode and allows current to flow from the capacitor 62 through the diac 64 and into the gate of the triac 66. The triac 66 will then and dump the charge which had begun to build up on the capacitor 54. The sequence of charging the capacitor 62 and dumping the capacitor 54 will continue until the appliance is switched off, by opening the switch 12, thereby disconnecting the charging path for the capacitor 62. Once the appliance 10 is switched off, the capacitor 54 is allowed to charge to a voltage level sufficient to cause the energizing coil 56 to close the normally open contact pair 58. When the normally open contact pair 58 is closed, this will bypass the resistor 60 and the capacitor 62 to disable the operation of the load sensing portion of the circuitry, and allow normal operation of the appliance 10. The appliance 10 may now switched on or off at will and the safety device will have no effect on appliance operation. The safety device is reactivated either by removing the appliance plug 78 from the receptacle 38 or by removing the AC power from the input prongs 34, 36 of the safety device 30.

In order for an operator to be made aware of the protective operation of the safety device, so that the operator does not think that the appliance is defective, a light emitting diode 44 is connected in series with the triac 66. This light emitting diode 44 will be energized each time the triac 66 is triggered by the diac 64 and capacitor 62.

A feature of the safety device described herein is that the relay contact pair 58 is not used for switching the appliance power on or off. The contact pair 58 can only close if the appliance is switched off. The contact pair 58 will open after the appliance is unplugged from the receptacle 38 or AC power is removed from the safety device itself.

A further feature of the described device is that the socket 70 allows the circuitry to discriminate between the situation where no appliance is plugged in and the situation where an appliance is plugged in but is switched off.

Another feature of the device constructed in accordance with the principles of this invention is that this device may be utilized with two speed or variable speed appliances. A two speed appliance typically operates by only utilizing alternate half cycles of the AC power. A variable speed appliance typically operates by some form of phase control of the AC power. The device according to the present invention responds quickly enough to discriminate even the partial cycle current pulses of such appliances.

Although there has been described a device having a special socket, such device being adapted to accept an appliance input plug assembly, the described device is readily adaptable to be built into the appliance itself or as part of its line cord. In such instance, the circuitry would remain the same with there being dedicated connections between the equivalents of the contact element 72 and the prong 80 and the contact elements 74, 76 and the prong 82.

Accordingly, there has been disclosed a safety device for preventing the operation of an electric appliance when the appliance is connected to a power source when the appliance switch is closed. It is understood that the abovedescribed embodiment is merely illustrative of the application of the principles of this invention. Numerous other embodiments may be devised by those skilled in the art without departing from the spirit and scope of this invention, as defined by the appended claims.

We claim:

1. A safety device adapted to be connected between a source of AC power and power input terminals of an electric appliance having a switch for selectively closing a current carrying path for said appliance, said safety device functioning to prevent the application of operating power to said appliance when said appliance switch is closed upon connection of said appliance to said AC power source through said safety device, said safety device comprising:
    input means for connecting said safety device to said AC power source;
    output means for connecting said power input terminals of said appliance to said safety device;
    means for providing a low level sensing current path between said input means and said output means;
    power supply means for providing a high level operating current path between said input means and said output means a predetermined time after the connection of both said input means to said AC power source and said output means to said appliance power input terminals, said high level operating current path bypassing said low level sensing current path; and
    sensing means responsive to current flow through said low level sensing current path for disabling said power supply means prior to the expiration of said predetermined time.

2. The safety device according to claim 1 further including indicator means responsive to the disabling operation of said sensing means for providing an indication that said appliance switch is closed upon initial connection of said appliance to said AC power source.

3. The safety device according to claim 2 wherein said indicator means includes a light emitting diode.

4. The safety device according to claim 1 wherein said appliance power input terminals include a pair of prongs included as part of an input plug assembly and said output means includes a receptacle adapted to accept said prongs and a pair of separate contact elements adapted to be electrically connected together by one of said prongs when said plug assembly is inserted into said receptacle, a first of said contact elements being connected to said power supply means and the other of said contact elements being connected to said input means, said contact elements being so arranged that said one prong contacts said first contact element prior to contacting said other contact element.

5. The safety device according to claims 1 or 4 wherein said power supply means includes:
    a relay having an energizing coil and a normally open contact pair, said normally open contact pair being connected between said input means and said output means to provide said high level operating current path;
    a first capacitor connected across said coil; and a first resistor connected in series between one end of said coil and said output means, the other end of said coil being connected to said input means.

6. The safety device according to claim 5 further including a diode connected in series with said first resistor.

7. The safety device according to claim 5 wherein said low level sensing current path providing means includes a second resistor and said sensing means includes a second capacitor connected in series with said second resistor and means for sensing the voltage level on said second capacitor, the time constant of said first resistor and capacitor being substantially greater than the time constant of said second resistor and capacitor so that the operating voltage level of said sensing means across said second capacitor is reached before the voltage across said first capacitor reaches the operating voltage level of said relay energizing coil.

8. The safety device according to claim 7 wherein said sensing means further includes a controllable switching device connected across said first capacitor and having its control element coupled to said second capacitor, said controllable switching device being arranged to short circuit said first capacitor when the voltage across said second capacitor reaches a predetermined value.

9. The safety device according to claim 8 wherein said controllable switching device is a triac and further including a diac connected between the gate of said triac and the junction of said second capacitor and said second resistor.

10. The safety device according to claim 8 further including an electrically activated indicator in series with said controllable switching device across said first capacitor.

11. The safety device according to claim 10 wherein said indicator includes a light emitting diode.

12. A safety device adapted to prevent the application of operating power from an AC source to an electric appliance having a manually operable power-supplying switch when said switch is closed upon connection of said appliance to said AC source, said safety device comprising:

first timing means responsive to the connection of said appliance to said source for timing a first predetermined interval;

means responsive to said connection when said switch is closed for allowing sensing current to flow through said appliance;

second timing means responsive to the flow of said sensing current for timing a second predetermined interval less than said first predetermined interval; and means responsive to the termination of said second predetermined interval for causing said first and second timing means to reinitiate their respective timing functions.

13. The safety device according to claim 12 further including means responsive to the termination of said first predetermined interval for providing operating power to said appliance and disabling said second timing means.

* * * * *